United States Patent Office 3,345,296
Patented Oct. 3, 1967

3,345,296
CORROSION INHIBITION
Charles W. Lutz, Clark, N.J., assignor to FMC Corporation, New York, N.Y., a corporation of Delaware
No Drawing. Filed Feb. 28, 1964, Ser. No. 348,281
20 Claims. (Cl. 252—136)

This invention relates to concentrated, phosphorus-containing aqueous solutions, and particularly to such solutions inhibited against corrosive attack on mild steel.

Concentrated aqueous phosphoric acid, having a concentration of about 60 to 85 weight percent of the acid, is employed as a source of phosphorus in fertilizers and other applications such as modification of ensilage for animal feeds. In fertilizer use it is employed either directly or after neutralization with ammonia or other nitrogen-containing compounds, and if desired with potassium-containing compounds, to produce neutralized aqueous solutions such as the 6–18–6 mixture (containing 6 weight percent nitrogen, 18 weight percent phosphorus as $P_2O_5$ and 6 weight percent potassium as $K_2O$), the 8–24–0 mixture, the 10–15–0 mixture, the 15–15–0 mixture and the 15–10–0 mixture.

Use of concentrated phosphoric acid has had a serious drawback, however. It is corrosive to inexpensive equipment which desirably would be employed in storing and shipping it, as well as in formulating and using it such as in neutralization to provide the mixtures referred to above. Accordingly, it has been necessary to formulate, store and use concentrated phosphoric acid in expensive equipment formed of corrosion resistant materials such as stainless steel or mild steel lined with rubbers or plastics resistant to the acid.

It is of interest that the concentrated phosphoric acid provides a particular problem in its effect on mild steel. Phosphoric acid of lower concentrations, normally about 10 to 30 weight percent, is employed in pickling solutions and the like because of its high corrosivity. Selection of additives for the low concentration acid solutions is primarily based on the ability of these additives to provide selective attack on iron oxide, impurities therein and the like.

An entirely different problem exists in developing inhibitors for concentrated phosphoric acid solutions; in this case the solutions are not used for the purpose of attacking metals or coatings thereon. Rather, they are employed for other purposes, particularly fertilizer and animal feed use, and their attack on mild steel must be minimized. Additives for the concentrated phosphoric acid therefore must be selected on an entirely different basis than that on which additives are selected for use with low concentration acid.

Much research has been devoted to development of inhibitors for use with concentrated phosphoric acid and with neutralized solutions thereof, in an attempt to overcome the corrosion problem. Despite this effort, however, only a few useful inhibitors have been developed which will inhibit the attack of concentrated aqueous phosphoric acid or neutralized solutions thereof on mild steel, and at the same time stay in solution in the concentrated acid and aqueous ammonium phosphate solutions where they will remain available to effect the necessary inhibition. One problem which has occurred with most otherwise useful inhibitors has been separation of certain portions of the inhibitor from the solution, with the formation of gummy deposits which clog equipment and coat tank walls and the like in storage and use. Several useful inhibitor systems which generally meet the needs described above are described in copending patent applications Ser. No. 249,317, filed Jan. 4, 1963, now U.S. Patent No. 3,197,301, Ser. No. 290,339, filed June 25, 1963 and Ser. No. 319,675, filed Oct. 29, 1963, all assigned to the assignee of record of this application.

The inhibitor systems described in the aforesaid copending patent applications have been highly useful, and represent important advances in the art. However, it has been desired, and it is a principal object of this invention, to improve even on these and other effective inhibitors, and to make possible the use of less total amount of inhibitor in the acid and neutralized acid solutions without reducing the inhibitor effect.

It is a further object of this invention to provide inhibitor systems which in addition to being effective inhibitors, are particularly resistant to separation of inhibitor components.

It has now been found that the effectiveness of certain Base Inhibitors identified hereinafter in inhibiting corrosive attack of concentrated, phosphorus-containing aqueous solutions on mild steel is improved markedly by use with them of very small amounts, only about 0.01 to 100, and preferably 1 to 10, parts by weight of ethylquionolinium iodide per million parts by weight (p.p.m.) of the solution, together with 0.03 to 0.20% by weight, based on the weight of the solution, of the Base Inhibitor. If desired, the Base Inhibitor and ethylquinolinium iodide may be added as a mixture containing the two in the relative proportions by weight of 0.0001 to 1, and preferably 0.01 to 0.1, part of the ethylquinolinium iodide to 3 to 20 parts of the Base Inhibitor.

Addition of the ethylquinolinium iodide also reduces substantially the amount of Base Inhibitor required for effective inhibition, in many cases reducing it by as much as one-half without sacrificing protection. This is surprising when it is realized that the herein small amounts of this additive are quite ineffective in themselves in inhibiting phosphorus-containing solutions against corrosive attack on mild steel. Likewise, the function of the ethylquinolinium iodide additive is far from clear, since with some of the formulations increasing the amount of this additive reduces, rather than increases, its effectiveness.

The Base Inhibitors which are improved by addition to them of ethylquinolinium iodide in the herein amounts are:

Base Inhibitor A, a mixture of 3:1 to 1:3 parts by weight respectively of (a) a di-long-chain-alkyl dimethyl ammonium chloride in which the alkyl chains have 8 to 18 carbon atoms, and (b) a rosin amine derivative having the formula

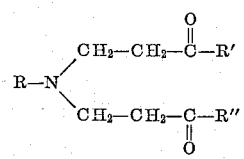

wherein R is from the group consisting of abietyl, hydroabietyl and dehydroabietyl radicals, and R' and R'' are from the group consisting of lower alkyl and phenyl radicals;

Base Inhibitor B, a mixture of about 1:3 to 3:1 parts by weight of (a) an alkyl trimethyl ammonium chloride and (b) a dialkyl dimethyl ammonium chloride, in which the alkyl groups have 8 to 18 carbon atoms, and preferably 10 to 14 carbon atoms;

Base Inhibitor C, a mixture of (a) a member of the group consisting of N-alkyl-β-iminodipropionic acid, the alkali metal salts and the ammonium salt thereof, having the following formula

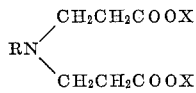

wherein R is constituted at least 70% of alkyl groups having 10 to 14 carbon atoms and the remainder of aliphatic groups having 8 to 18 carbon atoms, and preferably 12 carbon atoms, and X is from the group consisting of hydrogen, sodium, potassium and ammonium, together with (b) a member of the group consisting of 1,1,2-substituted sulfonated imidazolinium hydroxide, the alkali metal salts and the ammonium salt thereof, having the following formula

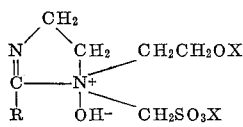

wherein R is constituted at least 70% of alkyl groups having 10 to 14 carbon atoms and the remainder of aliphatic groups having 8 to 18 carbon atoms, and preferably 12 carbon atoms, and X is from the group consisting of hydrogen, sodium, potassium and ammonium, in which the ingredients are employed in the relative proportions of 1 to 10, and preferably 1.3 to 4 parts by weight of ingredient (a) to one part by weight of ingredient (b); and Base Inhibitor D, a substituted imidazoline compound having the following formula

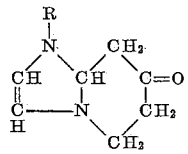

wherein R is an alkyl radical having 12 to 20 carbon atoms.

Discovery of this effect of ethylquinolinium iodide as an additive to corrosion inhibition system is of real value commercially, since it makes possible either improved inhibition for particularly aggravated uses or a reduction in the total amount of inhibitor required which means that the probability of separation of inhibitor components under difficult use conditions is reduced.

The additive found useful for this purpose, namely ethylquinolinium iodide, is readily obtainable commercially and is readily soluble in and compatible with the herein aqueous phosphorus-containing systems. It will be apparent that closely related compounds, namely other lower alkyl quinolinium halides, will find utility in this application and it is intended that such compounds fall within the scope of the appended claims.

The phosphorus-containing solutions treated with the herein inhibitors are aqueous concentrated phosphoric acid solutions having concentrations of about 60 to 85 weight percent, and commonly about 75 weight percent, and aqueous phosphorus solutions derived by neutralization of the concentrated phosphoric acid. The neutralized solutions typically are the 8-24-0, 6-18-6, 10-15-0, 15-15-0, 15-10-0 and related mixtures utilized as liquid fertilizers and animal feed supplements; they normally are used at concentrations in aqueous solution near their maximum solubilities, namely at about 20 to 40% by weight of the total solution.

Neutralized phosphoric acid fertilizer compositions prepared from concentrated phosphoric acid may contain various mixtures of monoammonium phosphate, diammonium phosphate, ammonium nitrate, ammonium sulfate, urea, potassium chloride, potassium nitrate, and the like and other common fertilizer additives. They are formed by reaction of anhydrous ammonia, aqua ammonia and other nitrogen sources as well as potassium chloride and other common potassium sources, with concentrated phosphoric acid. The mixtures are blended in any desired fashion to provide the fertilizer having the desired concentration of nitrogen and phosphorus, and if desired, other additives.

The most corrosive of the herein phosphorus-containing solutions in their effect on mild steel is concentrated phosphoric acid. Accordingly, corrosion tests shown by way of example hereinafter were carried out with aqueous phosphoric acid solutions having concentrations of about 75 weight percent of the acid. On the other hand, the tendency of inhibitors to separate from the herein solutions is particularly aggravated in the case of the neutralized phosphoric acid solutions. The compatibility information given herein therefore was derived primarily on neutralized acid solutions.

The inhibitors which have been found heretofore to be particularly effective, and which are employed with ethylquinolinium iodide to form the present inhibitor compositions are those referred to above as Base Inhibitors A, B, C, and D. Base Inhibitor A is a synergistic mixture of a di-long-chain-alkyl dimethyl ammonium chloride in which the alkyl chains have 8 to 18 carbon atoms and a rosin amine derivative having the formula

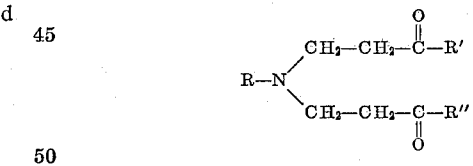

where R is an abietyl, hydroabietyl or dehydroabietyl radical, and R' and R'' are lower alkyl or phenyl radicals. When used without the ethylquinolinium iodide additive of this invention, these materials are employed in the concentrated, phosphorus-containing solutions in amount of from 0.04 to about 0.2 weight percent of the solution, and are employed in the relative proportions by weight of about 3:1 to 1:3 parts by weight of one ingredient to the other. When used with ethylquinolinium additive, Base Inhibitor A is used in the amount of 0.03 to 0.2% by weight. The preferred compositions from this class contain about equal parts by weight of the two, to two parts by weight of the rosin amine derivative to one part by weight of the alkyl dimethyl ammonium chloride. The rosin amine derivative normally, but not necessarily, is used in the form of its hydrochloride, since this is the form in which it is normally and readily prepared.

Base Inhibitor B is a synergistic mixture of an alkyl trimethylammonium chloride with a dialkyl dimethyl ammonium chloride, in which the alkyl groups have 8 to 18 carbon atoms, and preferably 10 to 14 carbon atoms. When used alone these mixtures are employed in the total concentration of from about 0.08 weight percent to 0.25 weight percent of the solution, and in proportions to one another of about 1:3 to 3:1 parts by weight. When used with the ethylquinolinium iodide additive, they are employed in the amount of about 0.03 to 0.2% by weight. The alkyl groups in these materials preferably are derived from naturally occurring oils which are mixtures of fatty esters, with a typical case being the dicoco dimethyl ammonium chloride based on coconut oil, which therefore contains as percent of total of alkyl groups, approximately 47% of dodecyl, 18% of tetradecyl, 10% of octadecyl, 9% of decyl and 8% of each of octyl and hexadecyl groups.

Base Inhibitor C is a mixture of an N-alkyl-β-iminodipropionic acid or an alkali metal or ammonium salt thereof having the following formula

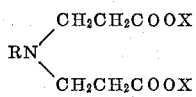

wherein R is constituted at least 70% of alkyl groups having 10 to 14 carbon atoms, and the remainder of aliphatic groups having 8 to 18 carbon atoms, and preferably 12 carbon atoms, and X is hydrogen, sodium, potassium or ammonium, together with a 1,1,2-substituted sulfonated imidazolinium hydroxide or an alkali metal or ammonium salt thereof having the following formula

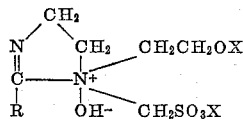

wherein R is constituted at least 70% of alkyl groups having 10 to 14 carbon atoms and the remainder of aliphatic groups having 8 to 18 carbon atoms, and preferably 12 carbon atoms, and X is hydrogen, sodium, potassium or ammonium. When used alone this mixture is employed in the concentrated, phosphorus-containing solution in the amount of about 0.07 total percent by weight on the aqueous solution, to about 0.25 weight percent on this basis. When used with the ethylquinolinium additive, they are employed in the amount of about 0.03 to 0.2% by weight. The ingredients normally are employed in the relative proportions of 1–10, and preferably 1.3–4, parts by weight of the N-alkyl-β-iminodipropionic acid compound to 1 part by weight of the second ingredient. The dipropionic acid compound normally is employed in the form of its partial salt, in which one carboxyl group is converted to the sodium salt, often being sold in this form, partially for reasons of its water solubility. The 1,1,2-substituted sulfonated imidazolinium hydroxide also normally is sold in the form of its sodium salt, again largely for solubility reasons. Again, in this case a convenient and highly useful form of the compounds is that in which the R groups are derived from coconut oil.

Base Inhibitor D is a substituted imidazoline compound having the following formula

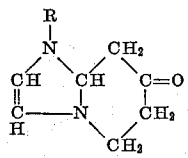

wherein R is an alkyl radical having 12 to 20 carbon atoms.

In addition to these inhibitors up to about equal amounts of additional ingredients may be employed in the inhibitor compositions. For example cationic wetting agents such as polyethoxylated quaternary ammonium salts having the formula

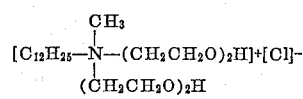

and anti-pitting agents such as tolyl mercapto acetic acid, and additional agents such as propargyl alcohol, isopropyl alcohol and the like may be employed.

The herein inhibitor systems preferably are predissolved in a solvent such as water or an alcohol such as isopropyl alcohol or other alcohol alone or with water, and added with stirring in this form to the acid or neutralized acid system to be inhibited. The mixing and subsequent storage and use can be carried out safely even in mild steel equipment by reason of the excellent corrosion inhibiting character of the present mixtures and is not accompanied by separation of inhibitor from solution.

The following examples are given by way of illustration of the present invention only, and are not to be construed as limiting the scope thereof in any way. The test specimens employed in the examples were mild cold rolled steel strips measuring 3″ by 1½″ by ⅛″ thick and conforming to AISI 1018 specifications. These strips were cleaned by surface degreasing, acid pickling in 10% hydrochloric acid, neutralization in sodium bicarbonate, rinsing with water and drying. They were weighed to ±0.1 mg.

The mild steel strips prepared in this manner were tested for corrosion in some cases by a static corrosion test and in others by a dynamic test. In the static test, the strips were placed in beakers containing 490 grams of aqueous 75% phosphoric acid containing inhibitors as noted in the tables which follow, held at 50° C. At the end of the time periods noted in the tables the strips were removed, water rinsed, dried and weighed. The rates of corrosion during the periods were expressed in mils per year (m.p.y.), a value calculated by the following formula:

If $W$=loss in weight (in grams) of the test piece during the time of immersion, $A$=area of test piece in square inches (9.0), $S$=density of the metal in grams per cubic centimeter (7.80), $T$=time of exposure in days, and $m.p.y.$=the rate of chemical corrosion expressed as mils penetration per year, then $$m.p.y. = \frac{1000 \times 365 \times W}{(2.54)^3 A S T}$$

for this test, which is designated as the Static Corrosion Test. Values of 20 to 25 m.p.y. for this test are considered acceptable.

In the Dynamic Swirl Corrosion test, the AISI 1018 steel strips prepared as described above were masked on their edges, and placed in pint jars containing 397 grams of aqueous 75% phosphoric acid containing inhibitors as noted in the following tables, and held at 25° C. The jars were capped and placed on a No. 8914 A. H. Thomas Company Laboratory Shaker, where they were shaken over five days in a fashion to provide alternate immersion and exposure of the coupons therein. The rates of corrosion were determined after two and five days of shaking by removing the coupons, water washing them, drying them and determining their weights. Calculations were made using the above formula to give the rates of corrosion in mils per year (m.p.y.). Values of about 30 m.p.y. are acceptable for this test for five day results.

The following tables show the results of a series of tests carried out by the Static and Dynamic Test methods referred to above, employing each of the Base Inhibitors with ethylquinolinium iodide. Several examples are included by way of comparison, and these examples are clearly marked "Neg" to indicate that they are negative, not within the scope of this invention.

The formulations tested are shown in Table I, while results of the tests are shown in Table II.

TABLE I

| Example | Inhibitor Component | Individual Component Concentration [1] | Total Inhibitor Concentration [1] | Ethylquinolinium Iodide Concentration (p.p.m.) |
|---|---|---|---|---|
| 1.—Neg.: | | | | |
| (a) | Uninhibited Acid | 0 | 0 | 0 |
| (b) | do | | | 1 |
| (c) | do | | | 10 |
| 2.—Neg.: | | | | |
| (a) | Rosin amine derivative [2] | 0.08 | 0.08 | 0 |
| (b) | do | | | 1 |
| 3.—Base Inhibitor A: | | | | |
| (a) | Rosin amine derivative [2] | 0.04 | 0.08 | 0 |
|  | Dialkyl dimethyl ammonium chloride [3] | 0.04 | | |
| (b) | do | | | 1 |
| 4.—Base Inhibitor A: | | | | |
| (a) | Rosin amine derivative [4] | 0.04 | 0.11 | 0 |
|  | Dialkyl dimethyl ammonium chloride [3] | 0.04 | | |
|  | Tergitol NP-35 [5] | 0.03 | | |
| (b) | do | | | 1 |
| 5.—Base Inhibitor A: | | | | |
| (a) | Rosin amine derivative [6] | 0.012 | 0.058 | 0 |
|  | Dialkyl dimethyl ammonium chloride [3] | 0.024 | | |
|  | Polyethoxylated quaternary ammonium chloride [7] | 0.017 | | |
|  | Tolyl mercapto acetic acid | 0.004 | | |
|  | Propargyl alcohol | 0.001 | | |
| (b) | do | | | 1 |
| (c) | do | | | 2 |
| 6.—Base Inhibitor A: | | | | |
| (a) | Rosin amine derivative [6] | 0.0150 | 0.072 | 0 |
|  | Dialkyl dimethyl ammonium chloride [3] | 0.030 | | |
|  | Polyethoxylated quaternary ammonium chloride [7] | 0.021 | | |
|  | Tolyl mercapto acetic acid | 0.005 | | |
|  | Propargyl alcohol | 0.001 | | |
| (b) | do | | | 1 |
| (c) | do | | | 10 |
| 7.—Base Inhibitor B: | | | | |
| (a) | Dialkyl dimethyl ammonium chloride [8] | 0.08 | 0.14 | 0 |
|  | Monoalkyl trimethyl ammonium chloride [9] | 0.06 | | |
| (b) | do | | | 10 |
| 8.—Base Inhibitor C: | | | | |
| (a) | Substituted sulfonated imidazolinium hydroxide [10] | 0.08 | 0.12 | 0 |
|  | Salt of N-lauryl-β iminodipropionic acid [11] | 0.04 | | |
| (b) | do | | | 1 |
| (c) | do | | | 100 |
| 9.—Base Inhibitor D: | | | | |
| (a) | Fatty imidazoline reaction product [12] | 0.06 | 0.06 | 0 |
| (b) | do | | | 1 |
| (c) | do | | | 10 |
| 10.—Base Inhibitor D: | | | | |
| (a) | Fatty imidazoline reaction product [12] | 0.04 | 0.04 | 0 |
| (b) | do | | | 1 |
| (c) | do | | | 10 |
| 11.—Base Inhibitor A (No. EQI—shown as base for Examples 12 and 13). | Rosin amine derivative [6] | 0.012 | 0.058 | ---------- |
|  | Dialkyl dimethyl ammonium chloride [3] | 0.024 | | |
|  | Polyethoxylated quaternary ammonium chloride [7] | 0.017 | | |
|  | Tolyl mercapto acetic acid | 0.004 | | |
|  | Propargyl alcohol | 0.001 | | |
| 12.—Neg.: | Inhibitor of Example 11 plus potassium iodide. | | 0.058 | ---------- |
| (a) | 1 p.p.m. KI. | | | |
| (b) | 10 p.p.m. KI. | | | |
| 13.—Neg. | Inhibitor of Example 11 plus potassium iodate. | | 0.058 | ---------- |
| (a) | 1 p.p.m. KIO₃. | | | |
| (b) | 10 p.p.m. KIO₃. | | | |
| 14.—Base Inhibitor A: | | | | |
| (a) | Inhibitor of Example 11 | | 0.058 | |

TABLE II

| Example | Static Corrosion Rate (m.p.y.) After | | Dynamic Corrosion Rate (m.p.y.) After | | 75% H$_3$PO$_4$ | Compatibility With— | |
|---|---|---|---|---|---|---|---|
| | 2 Days | 7 Days | 2 Days | 5 Days | | 8-24 Ammonium Phosphate [13] | 15-10 Ammonium Phosphate [13] |
| 1.—(a) | 4,000-5,000 | | 300-400 | | | | |
| (b) | 4,000-5,000 | | 300-400 | | | | |
| (c) | 4,000-5,000 | | 300-400 | | | | |
| 2.—(a) | 71 | 56 | | | Solids separate | Cloudy | Cloudy. |
| (b) | 27 | 34 | | | ...do | ...do | Do. |
| 3.—(a) | 11 | 24 | | | No solids separate | Clear | Clear. |
| (b) | 7 | 9 | | | ...do | ...do | Do. |
| 4.—(a) | 15 | 18 | | | ...do | ...do | Do. |
| (b) | 10 | 12 | | | ...do | ...do | Do. |
| 5.—(a) | 35 | 41 | | | ...do | ...do | Do. |
| (b) | 4 | 4 | | | ...do | ...do | Do. |
| (c) | 5 | 4 | | | ...do | ...do | Do. |
| 6.—(a) | 22 | 34 | | | ...do | ...do | Do. |
| (b) | 4 | 4 | | | ...do | ...do | Do. |
| (c) | 1 | 1 | | | ...do | ...do | Do. |
| 7.—(a) | | | 15 | 19 | ...do | ...do | Do. |
| (b) | | | 8 | 8 | ...do | ...do | Do. |
| 8.—(a) | 9 | 11 | 14 | 45 | ...do | ...do | Do. |
| (b) | 3 | 3 | 11 | 25 | ...do | ...do | Do. |
| (c) | 1 | 2 | | | ...do | ...do | Do. |
| 9.—(a) | 14 | 15 | 17 | 76 | ...do | ...do | Do. |
| (b) | 4 | 4 | 8 | 30 | ...do | ...do | Do. |
| (c) | 2 | 5 | 7 | 27 | ...do | ...do | Do. |
| 10.—(a) | 37 | 37 | 20 | 61 | ...do | ...do | Do. |
| (b) | 8 | 17 | 12 | 30 | ...do | ...do | Do. |
| (c) | 5 | 11 | | | ...do | ...do | Do. |
| 11.—(a) | 35 | 41 | | | ...do | ...do | Do. |
| 12.—(a) | 83 | 178 | | | ...do | ...do | Do. |
| (b) | 75 | 157 | | | ...do | ...do | Do. |
| 13.—(a) | 73 | 159 | | | ...do | ...dg | Do. |
| (b) | 57 | 122 | | | ...do | ...do | Do. |
| 14.—(a) | 4 | 4 | | | ...do | ...do | Do. |

NOTES TO TABLES I AND II

Note 1.—Concentrations are expressed in terms of amount of ingredient in the phosphorus-containing solution as weight percent based on the solution weight, of the active ingredient, excluding solvents and other carriers.

Note 2.—

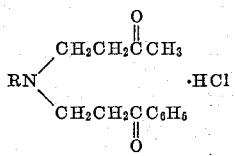

wherein R is dehydroabietyl. Introduced as about 85% active ingredient and about 10% isopropanol, balance water.

Note 3.—

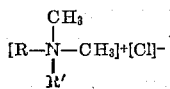

where R and R' are alkyl groups having 8 to 18 carbon atoms in the amount of 8% octyl, 9% decyl, 47% dodecyl, 18% tetradecyl, 8% hexadecyl and 10% octadecyl, introduced as 75% active ingredient in isopropyl alcohol.

Note 4.—

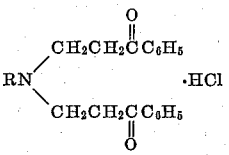

wherein R is abietyl; introduced as about 85% active ingredient and about 10% isopropanol, balance water.

Note 5.—Nonyl phenyl polyethlylene glycol ether; a water soluble, 100% active ingredient nonionic detergent having a cloud point of 96° C. Sold by Union Carbide Corporation as Tergitol NP-35.

Note 6.—

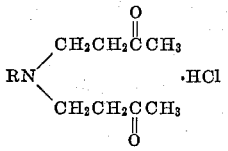

wherein R is hydroabietyl; introduced as about 85% active ingredient and about 10% isopropanol, balance water.

Note 7.—

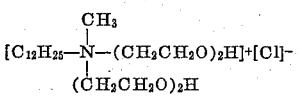

Note 8.—

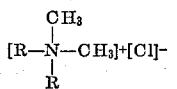

where R is a mixture of alkyl groups having 8 to 18 carbon atoms in the amount of 8% octyl, 9% decyl, 47% dodecyl, 18% tetradecyl, 8% hexadecyl and 10% octadecyl.

Note 9.—

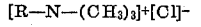

where R is a mixture of an alkyl group having 8 to 18 carbon atoms in the amount of 90% dodecyl, 9% tetradecyl and 1% octadecenyl.

Note 10.—

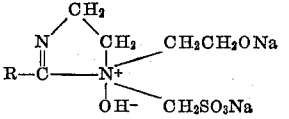

where R is a mixture of aliphatic groups derived from coconut oil containing about 8% of octyl, 9% of decyl, 47% of dodecyl, 18% of tetradecyl, 10% of octadecyl and the remainder various saturated and unsaturated aliphatic groups.

Note 11.—

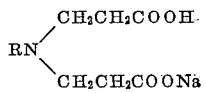

where R is the dodecyl group.

Note 12.—

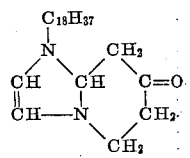

Note 13.—Aqueous ammonium phosphate solutions respectively having ammonium concentrations of 8% and 15% expressed as nitrogen, and phosphorus concentrations of 24% and 10% expressed as $P_2O_5$.

It will be seen from these examples that the Base Inhibitors are improved considerably by addition of extremely small amounts (a few parts per million) of ethylquinolinium iodide. It is possible to employ extremely small concentrations of these inhibitors when the ethylquinolinium iodide is present, and yet obtain excellent corrosion resistance compared with the results obtained when no ethylquinolinium iodide is employed. It also is shown in the examples, see particularly Examples 11 to 13, that it is not merely the presence of iodine in a compound which causes the improvement; neither potassium iodide nor potassium iodate is effective as an additive to Base Inhibitor A, for example.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

I claim:
1. Aqueous phosphorus-containing solution, having a high degree of compatibility against component separation and inhibited against corrosion of mild steel, said aqueous solution having a phosphorus-containing ingredient from the group consisting of concentrated phosphoric acid and an ammonium phosphate and essentially containing as the predominating inhibitor against said corroson 0.01 to 100 p.p.m. of ethylquinolinium iodide on the weight of said solution and 0.03 to 0.20 percent by weight of the weight of said solution of a base inhibitor from the group consisting of:

Base Inhibitor A, a mixture of 3:1 to 1:3 parts by weight respectively of (a) a di-long-chain-alkyl dimethyl ammonium chloride in which the alkyl chains have 8 to 18 carbon atoms, and (b) a rosin amine derivative having the formula

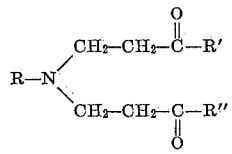

wherein R is from the group consisting of abietyl, hydroabietyl and dehydroabietyl radicals, and R' and R'' are from the group consisting of lower alkyl and phenyl radicals;

Base Inhibitor B, a mixture of about 1:3 to 3:1 parts by weight of (a) an alkyl trimethyl ammonium chloride and (b) a dialkyl dimethyl ammonium chloride, in which the alkyl groups have 8 to 18 carbon atoms;

Base Inhibitor C, a mixture of (a) a member of the group consisting of N-alkyl-β-iminodipropionic acid, the alkali metal salts and the ammonium salt thereof, having the following formula

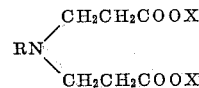

wherein R is constituted at least 70% of alkyl groups having 10 to 14 carbon atoms and the remainder of aliphatic groups having 8 to 18 carbon atoms, and X is from the group consisting of hydrogen, sodium, potassium and ammonium, together with (b) a member from the group consisting of 1,1,2-substituted sulfonated imidazolinium hydroxide, the alkali metal salts and the ammonium salt thereof, having the following formula

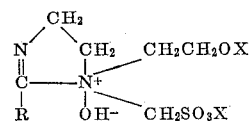

wherein R is constituted at least 70% of alkyl groups having 10 to 14 carbon atoms and the remainder of aliphatic groups having 8 to 18 carbon atoms, and X is from the group consisting of hydrogen, sodium, potassium and ammonium, in which the ingredients are employed in the relative proportions of 1 to 10 parts by weight of ingredient (a) to one part by weight of ingredient (b); and Base Inhibitor D, a substituted imidazoline compound having the following formula

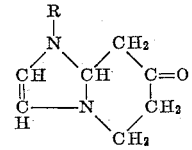

wherein R is an alkyl radical having 12 to 20 carbon atoms.

2. Solution of claim 1 in which the ethylquinolinium iodide is employed in the amount of 1 to 10 parts per million, and the base inhibitor is employed in the amount of 0.03 to 0.20% by weight, on the weight of the solution being inhibited.

3. Solution of claim 1 in which the base inhibitor employed is Base Inhibitor A.

4. Solution of claim 3 in which the ethylquinolinium iodide is employed in the amount of 1 to 10 parts per million, and Base Inhibitor A is employed in the amount of 0.03 to 0.20% by weight, on the weight of the solution being inhibited.

5. Solution of claim 1 in which the base inhibitor employed is Base Inhibitor B.

6. Solution of claim 5 in which the ethylquinolinium iodide is employed in the amount of 1 to 10 parts per million, and Base Inhibitor B is employed in the amount of 0.03 to 0.20% by weight, on the weight of the solution being inhibited.

7. Solution of claim 1 in which the base inhibitor employed is Base Inhibitor C.

8. Solution of claim 7 in which the ethylquinolinium iodide is employed in the amount of 1 to 10 parts per million, and Base Inhibitor C is employed in the amount of 0.03 to 0.20% by weight, on the weight of the solution being inhibited.

9. Solution of claim 1 in which the base inhibitor employed is Base Inhibitor D.

10. Solution of claim 9 in which the ethylquinolinium iodide is employed in the amount of 1 to 10 parts per million, and Base Inhibitor D is employed in the amount of 0.03 to 0.20% by weight, on the weight of the solution being inhibited.

11. Composition for use as the predominant inhibitor component for inhibiting aqueous phosphorus-containing solutions from the group consisting of aqueous phosphoric acid solutions and aqueous ammonium phosphote solutions against corrosion of mild steel, said composition essentially containing 0.0001 to 1 part by weight of ethylquinolinium iodide and 3 to 20 parts by weight of a base inhibitor from the group consisting of:

Base Inhibitor A, a mixture of 3:1 to 1:3 parts by weight respectively of (a) a di-long-chain-alkyl dimethyl ammonium chloride in which the alkyl chains have 8 to 18 carbon atoms, and (b) a rosin amine derivative having the formula

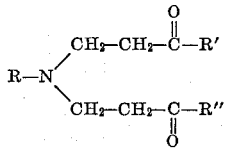

wherein R is from the group consisting of abietyl, hydroabietyl, and dehydroabietyl radicals, and R' and R" are from the group consisting of lower alkyl and phenyl radicals;

Base Inhibitor B, a mixture of about 1:3 to 3:1 parts by weight of (a) an alkyl trimethyl ammonium chloride and (b) a dialkyl dimethyl ammonium chloride, in which the alkyl groups have 8 to 18 carbon atoms;

Base Inhibitor C, a mixture of (a) a member from the group consisting of N-alkyl-β-iminodipropionic acid, the alkali metal salts and the ammonium salt thereof, having the following formula

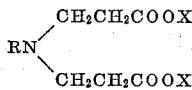

wherein R is constituted at least 70% of alkyl groups having 10 to 14 carbon atoms and the remainder of aliphatic groups having 8 to 18 carbon atoms, and X is from the group consisting of hydrogen, sodium, potassium and ammonium together with (b) a member of the group consisting of 1,1,2-substituted sulfonated imidazolinium hydroxide, the alkali metal salts and the ammonium salt thereof, having the following formula

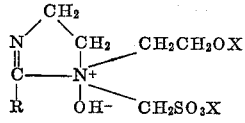

wherein R is constituted at least 70% of alkyl groups having 10 to 14 carbon atoms and the remainder of aliphatic groups having 8 to 18 carbon atoms, and X is from the group consisting of hydrogen, sodium, potassium and ammonium, in which the ingredients are employed in the relative proportions of 1 to 10 parts by weight of ingredient (a) to one part by weight of ingredient (b); and Base Inhibitor D, a substituted imidazoline compound having the following formula

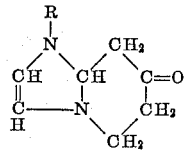

wherein R is an alkyl radical having 12 to 20 carton atoms.

12. Composition of claim 11 in which the ethylquinolinium iodide is present in the amount of 0.01 to 0.1 part by weight relative to 3 to 20 parts by weight of the base inhibitor.

13. Composition of claim 11 in which the base inhibitor employed is Base Inhibitor A.

14. Composition of claim 13 in which the ethylquinolinium iodide is present in the amount of 0.01 to 0.1 part by weight relative to 3 to 20 parts by weight of Base Inhibitor A.

15. Composition of claim 11 in which the base inhibitor employed is Base Inhibitor B.

16. Composition of claim 15 in which the ethylquinolinium iodide is present in the amount of 0.01 to 0.1 part by weight relative to 3 to 20 parts by weight of Base Inhibitor B.

17. Composition of claim 11 in which the base inhibitor employed is Base Inhibitor C.

18. Composition of claim 17 in which the ethylquinolinium iodide is present in the amount of 0.01 to 0.1 part by weight relative to 3 to 20 parts by weight of Base Inhibitor C.

19. Composition of claim 11 in which the base inhibitor employed is Base Inhibitor D.

20. Composition of claim 19 in which the ethylquinolinium iodide is present in the amount of 0.01 to 0.1 part by weight relative to 3 to 20 parts by weight of Base Inhibitor D.

References Cited
UNITED STATES PATENTS

| | | | |
|---|---|---|---|
| 1,809,041 | 6/1931 | Jenkins et al. | 23—165 |
| 2,006,216 | 6/1935 | MacArther et al. | 252—148 |
| 2,459,119 | 1/1949 | Rucker | 23—165 |
| 2,567,156 | 9/1951 | Malowan | 23—165 |
| 2,790,778 | 9/1957 | Spivack et al. | 252—392 |
| 2,955,087 | 10/1960 | Elbreder et al. | 252—136 |
| 2,985,662 | 5/1961 | Johnson et al. | 252—391 XR |
| 3,060,007 | 10/1962 | Freedman | 252—391 XR |
| 3,197,301 | 7/1965 | Lutz | 252—392 XR |

LEON D. ROSDOL, *Primary Examiner.*

M. WEINBLATT, *Assistant Examiner.*

UNITED STATES PATENT OFFICE
CERTIFICATE OF CORRECTION

Patent No. 3,345,296                                October 3, 1967

Charles W. Lutz

It is hereby certified that error appears in the above numbered patent requiring correction and that the said Letters Patent should read as corrected below.

Column 3, line 57, for "system" read -- systems --; columns 7 and 8, TABLE I, under the heading "Ethylquinolinium Iodide Concentration (p.p.m.)", at the bottom of the column insert -- 1 --; column 13, line 6, for "phosphote" read -- phosphate --; column 14, line 14, for "carton" read -- carbon --.

Signed and sealed this 4th day of February 1969.

(SEAL)
Attest:

Edward M. Fletcher, Jr.                                    EDWARD J. BRENNER

Attesting Officer                                               Commissioner of Patents